US008445104B2

(12) United States Patent
Vigunas et al.

(10) Patent No.: US 8,445,104 B2
(45) Date of Patent: May 21, 2013

(54) THERMALLY PRINTABLE ADHESIVE LABEL

(75) Inventors: Michael Vigunas, Lititz, PA (US); Charles Thiaville, Manlius, NY (US); William Robert Krahl, Baldwinsville, NY (US)

(73) Assignee: MAXStick Products Ltd., Lancaster, PA (US)

( * ) Notice: Subject to any disclaimer, the term of this patent is extended or adjusted under 35 U.S.C. 154(b) by 928 days.

(21) Appl. No.: 11/798,975

(22) Filed: May 18, 2007

(65) Prior Publication Data

US 2007/0267146 A1 Nov. 22, 2007

Related U.S. Application Data

(60) Provisional application No. 60/801,056, filed on May 18, 2006.

(51) Int. Cl.
*B32B 7/12* (2006.01)
*B32B 7/14* (2006.01)

(52) U.S. Cl.
USPC ....... 428/354; 428/40.1; 428/211.1; 428/323; 428/343; 428/352; 428/353; 428/355 RA; 428/355 AC; 428/906

(58) Field of Classification Search
None
See application file for complete search history.

(56) References Cited

U.S. PATENT DOCUMENTS 4,645,783 A 2/1987 Kinoshita
4,768,810 A * 9/1988 Mertens .......................... 462/26
4,851,383 A 7/1989 Fickenscher et al.
4,898,849 A 2/1990 Kang
5,194,329 A 3/1993 Hsieh et al.
5,292,713 A 3/1994 Stenzel et al.
5,354,588 A * 10/1994 Mitchell et al. .............. 428/41.6
5,462,909 A 10/1995 Lakes et al.
5,508,247 A 4/1996 Tran et al.
5,536,546 A 7/1996 Nash
5,547,738 A 8/1996 Mitchell et al.
5,578,352 A 11/1996 Smith
5,587,214 A 12/1996 Mitchell, Jr.
5,651,852 A 7/1997 Mitchell et al.
5,658,661 A 8/1997 Mitchell, Jr. et al.
5,661,099 A * 8/1997 Mitchell, Jr. .................. 503/201
5,691,437 A 11/1997 Main
5,723,190 A 3/1998 Osaka
5,750,192 A 5/1998 Smith
5,773,386 A 6/1998 Langan
5,810,397 A 9/1998 Mehta et al.
5,840,657 A 11/1998 Mehta et al.
5,926,197 A 7/1999 Kessler
5,941,451 A * 8/1999 Dexter ......................... 229/92.1
5,945,468 A 8/1999 Atkinson et al.
5,984,363 A 11/1999 Dotson et al.
5,985,441 A 11/1999 Szczepaniec et al.
6,001,473 A 12/1999 Atkinson et al.
6,015,589 A 1/2000 Mehta et al.

(Continued)

*Primary Examiner* — David Sample
*Assistant Examiner* — Jeff Vonch
(74) *Attorney, Agent, or Firm* — Harris Beach PLLC

(57) ABSTRACT

A linerless label roll of repositionable labels adapted to be printed in varying lengths comprising a web of thermally printable paper wound along a running axis and having a continuous length of adhesive on one side of the web so that when a length of the web is caused to be thermally printed it will have an adhesive on the reverse side thereof that extends in a uninterrupted manner along the entire length of the thermally printed web.

6 Claims, 8 Drawing Sheets

U.S. PATENT DOCUMENTS 6,051,311 A 4/2000 Osaka
6,124,236 A 9/2000 Mitchell, Jr.
6,129,965 A 10/2000 Langan
6,139,932 A 10/2000 Kline
6,231,922 B1 5/2001 Kline
6,258,746 B1 7/2001 Mehta et al.
6,268,032 B1 * 7/2001 Mertens et al. .............. 428/40.1
6,352,751 B1 3/2002 Miles et al.
6,379,764 B1 4/2002 Pusateri et al.
6,383,591 B1 5/2002 Miles et al.
6,383,631 B1 * 5/2002 Mehta ........................... 428/352
6,830,795 B1 * 12/2004 Downs ......................... 428/40.1
7,125,824 B2 10/2006 Mathiaparanam et al.
2005/0208250 A1 9/2005 Blank et al.
2005/0255298 A1 * 11/2005 Crum ......................... 428/195.1
2006/0134365 A1 6/2006 Blank et al.

* cited by examiner

THERMALLY PRINTABLE ADHESIVE LABEL

CROSS-REFERENCE TO RELATED APPLICATIONS

This application claims the benefit of U.S. Provisional Application Ser. No. 60/801,056 filed on May 18, 2006.

FIELD OF THE INVENTION

The present invention relates to adhesive labels and in particular, a repositionable adhesive label having a pressure sensitive adhesive on one side of the label.

BACKGROUND OF THE INVENTION

Adhesive labels are known and commercially available in a variety of forms depending upon the end use for the label. In one such configuration, a sheet material in the form of a continuous roll or fan-fold stack is provided with a pressure sensitive adhesive on its rear surface and a release coating is provided on the opposite surface of the sheet. The release coating is typically a silicone material that promotes a weak bond to the adhesive so that the sheet may be readily unrolled or otherwise separated from an adjacent sheet as desired. The separated label is adapted to be repositioned or otherwise adhered onto a surface as desired. Such labels are often referred to as linerless or repositionable labels and are adapted to be secured to a first surface and then removed from that surface and selectively applied to a second surface with little to no loss of adhesive properties.

In the fast food industry, it is known to generate a customer receipt for a transaction using a conventional thermal printer that contains a roll of thermosensitive paper.

Thermal printers typically contain a print head or bar having small heated elements that are individually controlled via digital input from a computer. When a thermosensitive or thermoreactive recording material is passed under the print head or print bar of the printer and selected heated elements activated, the thermosensitive or thermoreactive color forming layers on the recording material are activated and a desired print or indicia is generated on the recording material. Thermal printers are widely used to create business forms or records.

Attempts have been made in the prior art to provide a thermally printed customer receipt having adhesive on the reverse side so that the receipt may be repositioned or secured to a surface. Such efforts attempt to reduce or eliminate adhesive buildup within the printer which can adversely affect the performance of the printer.

One prior art linerless label roll includes a series of index marks uniformly spaced longitudinally apart. A series of adhesive patches runs along the web, with differently sized adhesive-free zones therebetween in register with the index marks. This type of prior art linerless label roll is incapable of providing a repositionable label of varying length and is limited to the distance between the index marks. Further, this prior art roll requires use of an optical sensor be provided in the printer to detect the location of the index marks.

Prior art linerless label rolls which provide a continuous strip of adhesive on the reverse side of the sheet have the disadvantage in that the adhesive tends to accumulate on the moving parts of the printer and otherwise cause a feed jam.

BRIEF SUMMARY OF THE INVENTION

The invention is a repositionable label roll for use in a thermal printer comprising a web of thermal paper having a top surface and a bottom surface wound into a roll, a barrier coat provided on the bottom surface, at least one adhesive strip provided on the barrier coat, the adhesive strip extending in a substantially uninterrupted manner along a running axis of the web and a release coat provided on the top surface, the release coat extending along the running axis of the web and behind the adhesive strip so that when a selected length of the thermal paper is caused to be thermally printed, the adhesive will extend in a continuous manner along the length of the thermally printed paper. The invention includes a fan fold version of the above described label roll.

DETAILED DESCRIPTION OF THE INVENTION

Figure 1:
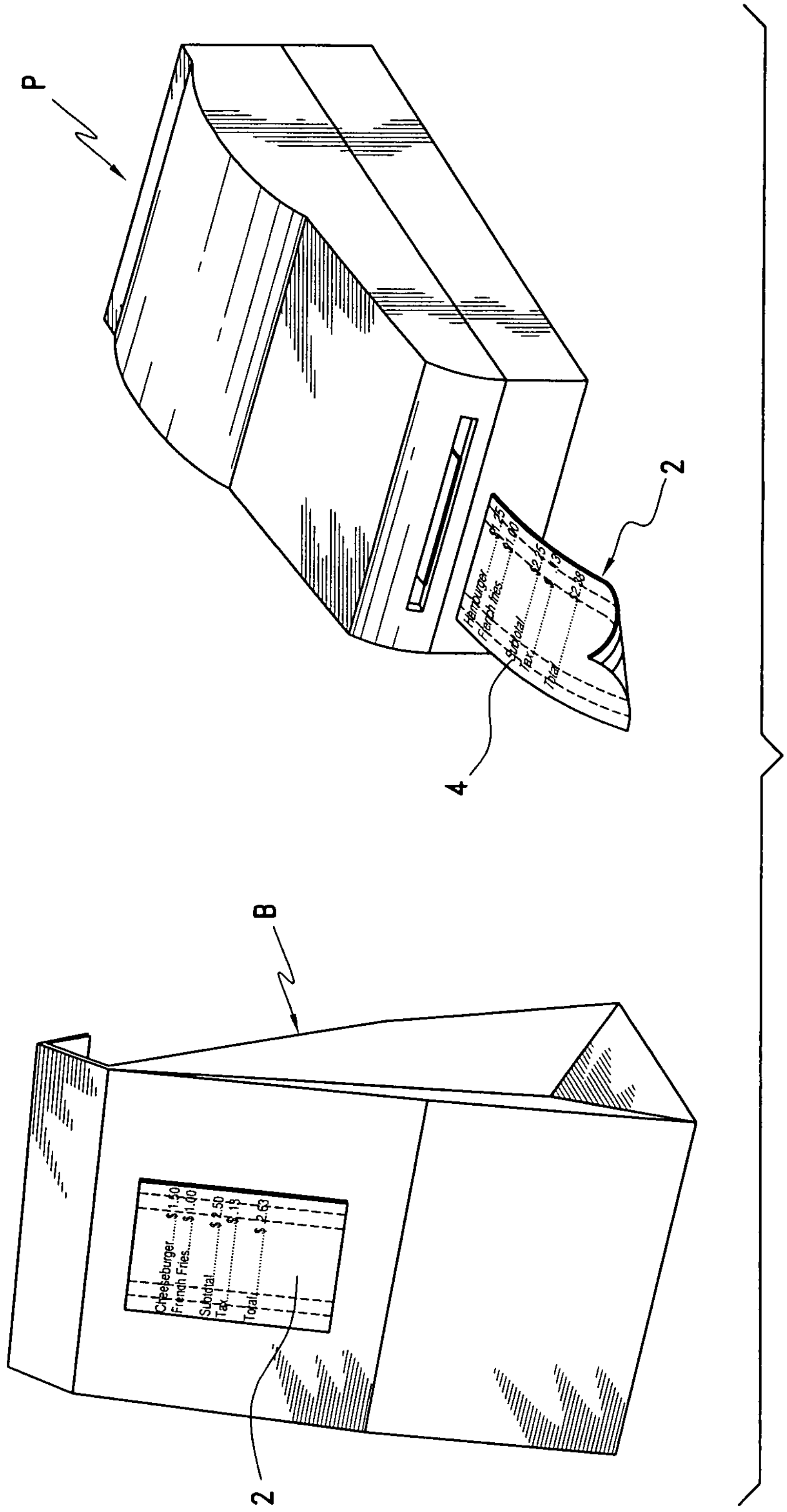
FIG. 1 illustrates a thermal printer which has printed a repositionable label according to the present invention and showing the printed label applied to a food bag.

FIG. 1 illustrates a conventional thermal printer P for printing a customer receipt shown in the figure as a printed linerless label 2. For example, within the restaurant industry, a printed label 2 containing indicia 4 would be generated to record a customer order or to provide a redeemable coupon or some other promotional information to the customer. After exiting the printer P, the label 2 according to the present invention is adapted to be secured to a bag B containing the customer order in the manner as shown in FIG. 1.

Figure 2:
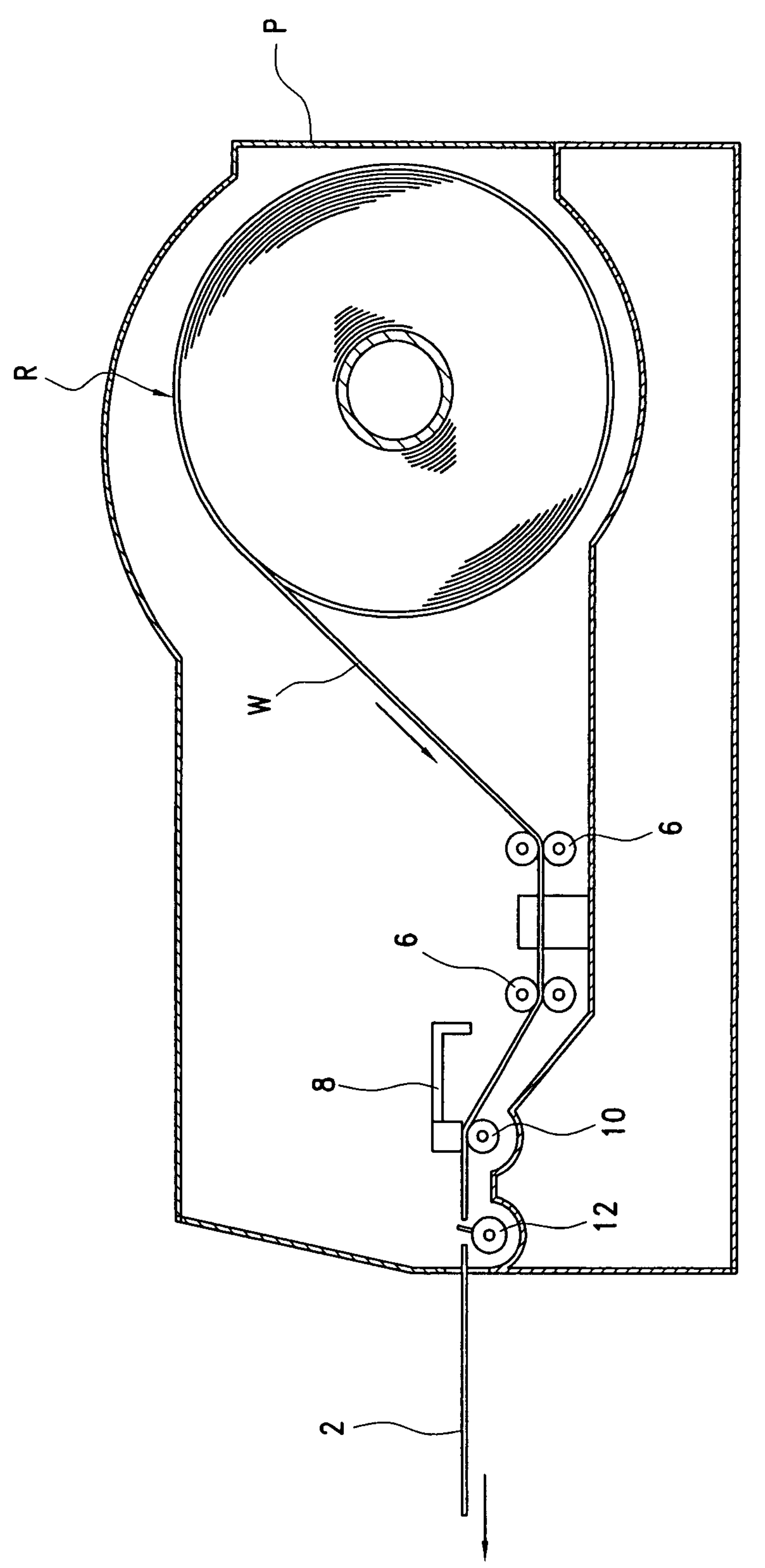
FIG. 2 is a side elevational view of the printer shown in FIG. 1 and showing the feedpath for moving a roll of linerless labels according to the present invention.

FIG. 2 generally illustrates a feedpath within printer P that may be a direct thermal printer or a thermal transfer printer. Thermal printers are commonly used to create business forms or records.

A thermal printer will typically include a print head or bar having small heated elements that are individually controlled via digital input to a computer. When a thermosensitive sheet is passed under the print head and selected heated elements activated, the thermoreactive color forming layers within the sheet are activated and a desired print is generated on the sheet of recording material.

As best shown in FIG. 2, the feedpath of the printer P includes a plurality of components between which a web of recording material will travel. The web W of thermosensitive recording material is unwound from a roll R in a longitudinal direction along the running axis of the web and between various guide rollers 6 until it reaches a printing head 8 which cooperates with guide roller 10. The printing head may be a thermal head assembly for use in direct thermal printing of the web that is formed from suitable thermosensitive paper stock. A thermal transfer ribbon is within the scope of the present invention.

At the outlet of the printer P is a cutter or tear bar 12 for allowing the user to tear or otherwise separate a printed label 2 from the continuous web of thermosensitive recording material. Various other cutting or tearing apparatus are within the scope of the present invention.

Figure 3:
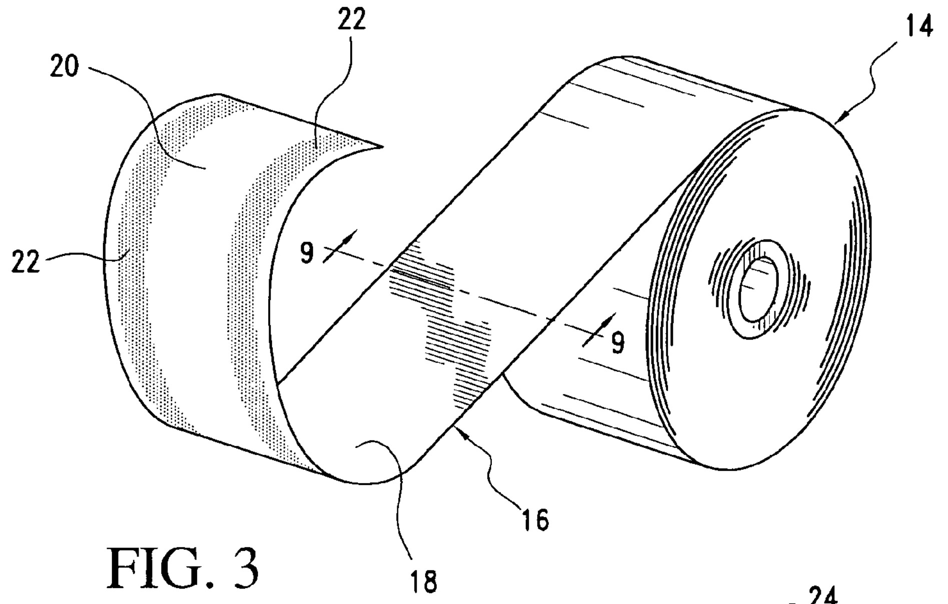
FIG. 3 illustrates a roll of repositionable labels according to one embodiment of the present invention for use within a conventional thermal printer of the type shown in FIG. 1.

FIG. 3 illustrates a roll of thermally printable adhesive labels 14 according to the present invention which is adapted to be inserted within a conventional thermal printer of the type shown in FIG. 2. The substrate or sheet material 16 is shown to comprise a first or upper surface 18 and a second or underside surface 20. Generally speaking the substrate 16 may be any high quality paper or other cellulosic or synthetic sheet material readily adapted to receive a thermosensitive coating or thermoreactive coating. Such papers are well known in the art. Continuous strips of adhesive coatings 22 are provided on the underside surface 20 and extend in an uninterrupted manner along the longitudinal axis of the web.

Figure 4:
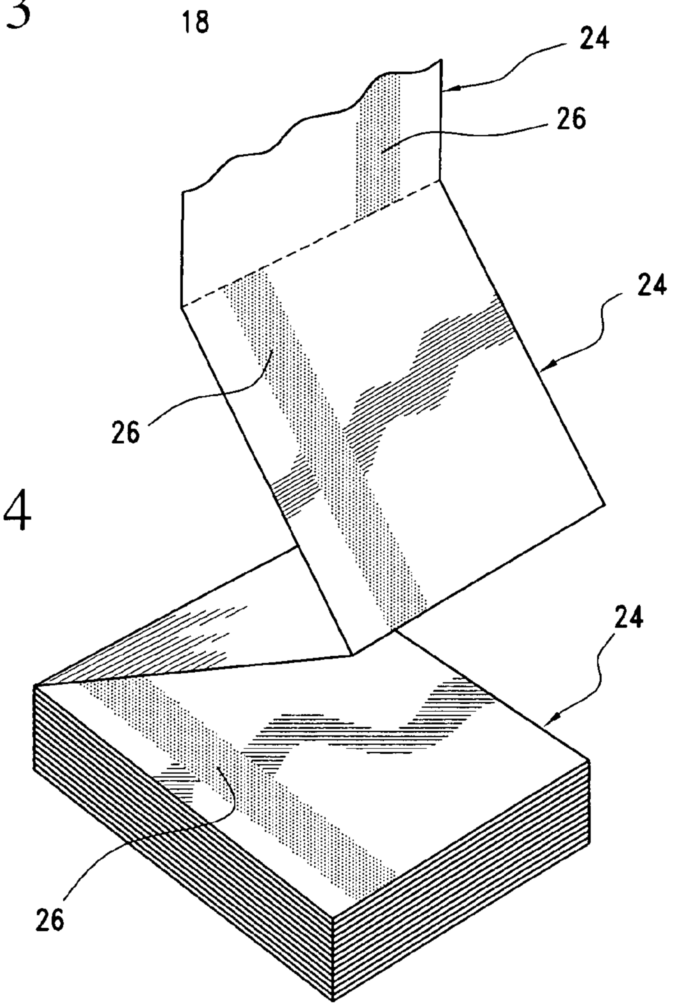
FIG. 4 illustrates the repositionable abels according to another embodiment of the present invention and in the form of a continuous folded web.

FIG. 4 illustrates another embodiment of the present invention in the form of a folded web of thermally printable adhesive labels with an adhesive coating 26 applied to the underside of the individual sheets 24 and in disposed in an alternating relation.

Figure 5:
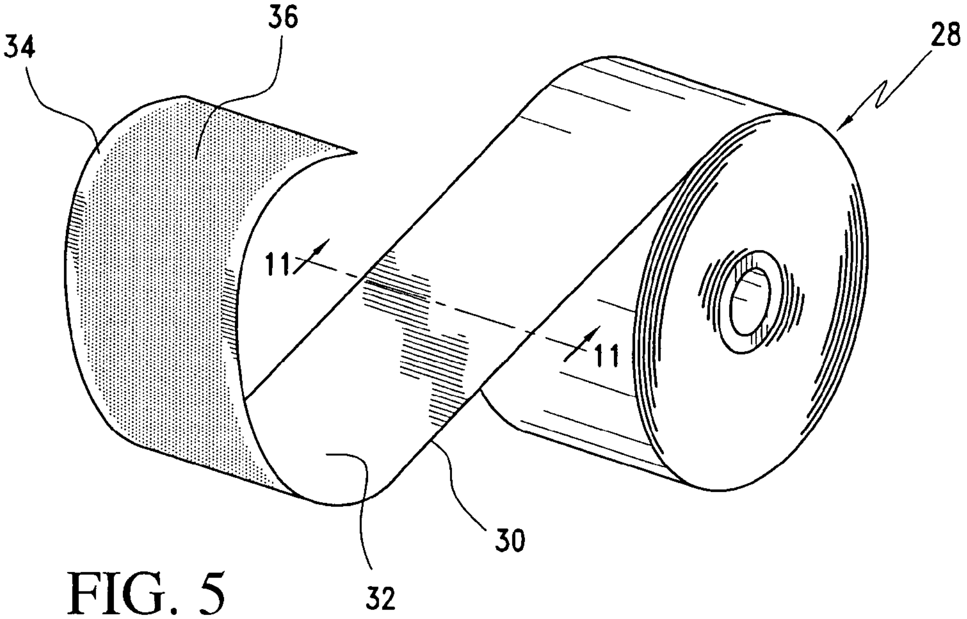
FIG. 5 illustrates a roll of repositionable labels according to still another embodiment of the present invention for use within a conventional thermal printer of the type shown in FIG. 1.

FIG. 5 illustrates a roll of thermally printable adhesive labels 28 according to another embodiment of the present invention and which is adapted to be inserted within a conventional thermal printer of the type shown in FIG. 2. The substrate or sheet material 30 is shown to comprise a first or upper surface 32 and a second or underside surface 34. Generally speaking the substrate 30 may be any high quality paper or other cellulosic or synthetic sheet material readily adapted to receive a thermosensitive coating or thermoreactive coating. Such papers are well known in the art. A continuous adhesive coating 36 is provided to substantially the entire underside surface 34 and extend in an uninterrupted manner along the longitudinal axis of the web.

Figure 6:
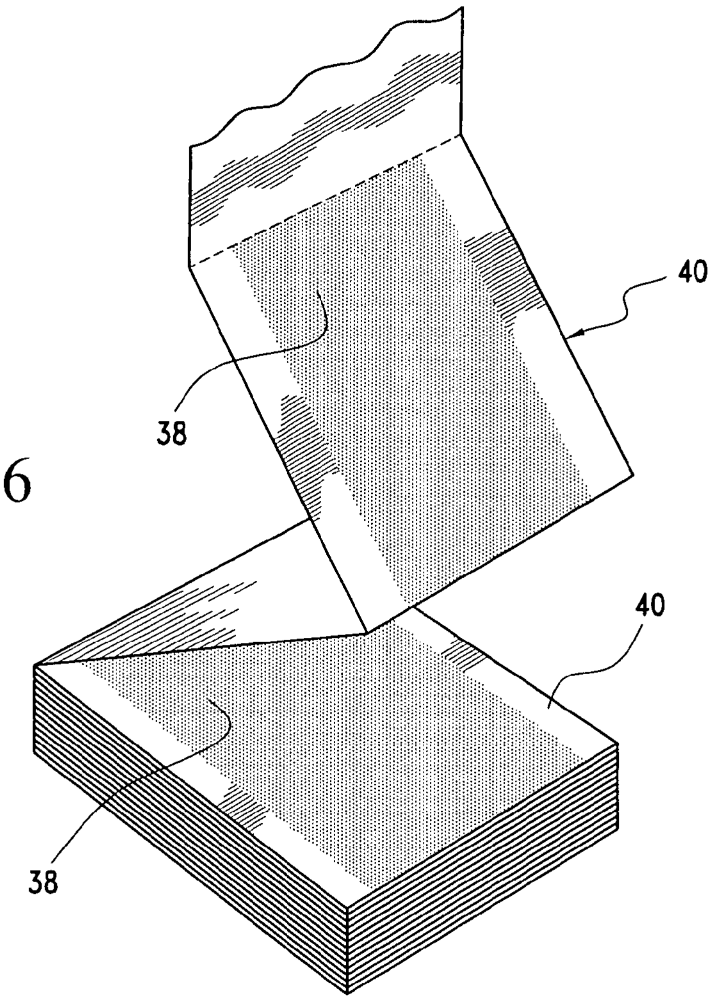
FIG. 6 illustrates the repositionable labels according to yet another embodiment of the present invention and in the form of a continuous folded web.

FIG. 6 illustrates another embodiment of the present invention in the form of a folded web of thermally printable adhesive labels with an adhesive coating 38 applied to substantially the entire underside of alternating individual sheets 40.

Figure 7:
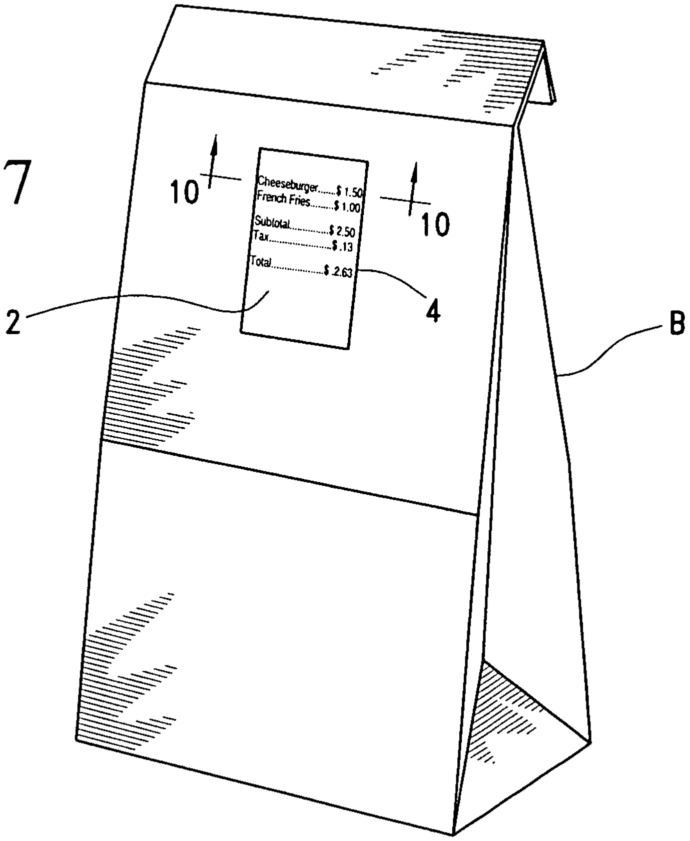
FIG. 7 illustrates a separated label according to the present invention and in the form of a printed receipt that has been secured to a bag.
Figure 8:
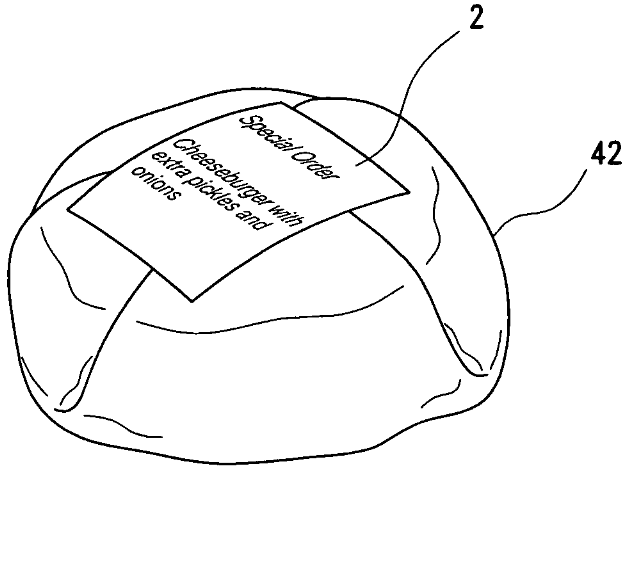
FIG. 8 illustrates a separate label according to the present invention and shown in the form of a printed receipt shown secured the wrapping to a foodstuff.

FIG. 7 illustrates a printed label 2 secured to a bag B containing a customer order whereas FIG. 8 illustrates the printed label 2 used to secure a wrapping paper 42 around a food product and when the label is in the form of a receipt, to identify the contents of the same.

Figure 9:
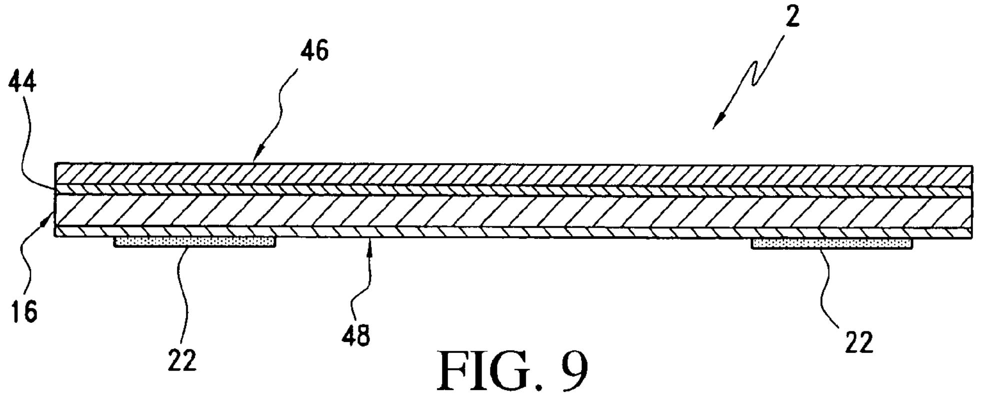
FIG. 9 is a cross-sectional view of a label shown in FIG. 3 and taken along lines 9-9.

Turning to FIG. 9, a label 2 formed from thermosensitive recording material according to the present invention is shown to comprise a substrate 44 in the form of a sheet material having first and second surfaces. Generally speaking, the substrate 44 may be any high quality paper or other cellulosic or synthetic sheet material readily adapted to receive a thermosensitive or thermoreactive coating. Such papers are well known in the art.

A first or upper surface of substrate 16 is provided with a thermosensitive or thermoreactive coating 44 comprising initially colorless color formers and color developers. Suitable thermally imagable coatings include, for example, the thermosensitive and thermoreactive coatings described in U.S. Pat. No. 6,258,746 the relevant portions of which are incorporated herein by reference. It is within the scope of the present invention to provide a stock thermal paper for use as substrate 16. Stock thermal papers are pre-coated with a thermosensitive or thermoreactive coating and may further include various other ingredients designed to protect the thermal imaging properties of the thermosensitive coating prior to and following thermal printing. Stock thermal papers are commercially available from a variety of manufacturers including, for example, Appleton Papers, Kanzaki Specialty Papers and Ricoh. Stock thermal papers which are available from other sources are within the scope of the present invention so long as they are adapted to receive the additional coatings and layers as further described below.

A second or underside surface of the substrate 16 is provided with a base coat preparation 48 that is coated onto the substrate 16 and then cured by heat or some other curing means. The base coat preparation 48 functions as a barrier to prevent migration of a subsequently applied adhesive into the substrate 16. The base coat preparation will also prevent the adhesive from contacting the substrate 16 and in particular, the thermal imaging coating 44. This ensures there is no premature activation or damage to the pigments within the thermal imaging coating 44. The base coat preparation 48 additionally functions to secure the adhesive to the label 2 so that it cannot be dislodged from the surface of the label during unrolling of the web. Suitable base coat preparations within the scope of the present invention are disclosed in U.S. Pat. No. 5,157,012, U.S. Pat. No. 5,071,821 and U.S. Pat. No. 4,870,047, the relevant portions of which are incorporated herein by reference.

A top surface coat 46 is provided over thermoreactive layer 44. The top surface coat 46 is preferably a starch or cellulose coating or a combination of starch and cellulose. The top surface coat functions as a type of release liner when the continuous web is in a roll form. That is, it enables the roll to be easily unwound despite the presence of an adhesive layer while at the same time it will not damage or otherwise deteriorate the adhesion characteristics of the pressure sensitive adhesive coating as the roll is unwound. In other words, the top surface coat 46 counteracts the pressure sensitive nature of the adhesive. The top surface coat is not damaged by the adhesive or otherwise separated from the recording material as the roll is unwound. A suitable composition for use as a top surface coat of the present invention is an aqueous modified maltodextrin dispersion marketed under the name SECOAT R 51 and manufactured by Omnova Solutions, Inc. of Chester, S.C. Other compositions for the top surface coat are within the scope of the present invention so long as it functions as a release liner in the manner described above and enables the roll to be easily unwound despite the presence of an adhesive layer and does not deteriorate the adhesion characteristics of the pressure sensitive adhesive coating as the roll is unwound.

An adhesive coating 22 is applied by printing or other means onto the base coat 48 and is best shown in FIG. 3 to comprise two parallel, continuous and uninterrupted lengths that extend along the longitudinal axis of the web of labels. As is apparent, the adhesive is not limited to the locations shown in FIG. 3 but may extend substantially over the entire surface of the underside of the substrate 16 and in a continuous and uninterrupted manner as best shown in FIG. 5.

The adhesive according to the present invention comprises clusters of tacky, elastomeric, solvent-insoluble, polymeric microparticles or microspheres or a combination of microparticles and microspheres that have been prepared by aqueous emulsion polymerization. Polymerization is initiated by reacting an aqueous suspension comprising monomers having at least one substantially water insoluble ester of alkyl acrylate or methacrylate, a stabilizer and an emulsifier together with a water-soluble redox polymerization initiator to produce clusters of elastomeric microparticles. During the polymerization, the monomers will form microparticles and/or microspheres that gradually coagulate to form clusters. Preferably, the polymerized microparticles form clusters having an average size about 300 microns, preferable between about 300 and 2,000 microns. The microparticles are spherical and have diameters in the range of from about 5 to about 200 microns.

A water-soluble redox system initiator comprises a pair of oxidizing and reducing agents is employed during polymerization. The oxidizing agent is preferably a persulfate such as ammonium persulfate, although a sodium persulfate or others may be used. The concentration of the persulfate is from about 0.25% to about 1.0% by weight of the monomers and preferably 0.75% by weight of the monomers. The reducing agent is ethylenedinitrilotetraacetic acid sodium ion (+3) salt (EDTA-Fe(3+)) that must be reduced by a second reducing agent, such as sodium formaldehyde sulfoxylate. The concentration of EDTA-Fe(3+) and sodium formaldehyde sulfoxylate is about 0.05 percent and about 0.5 percent by weight of the monomers, respectively.

In one embodiment of the present invention, the adhesive coating 22 of the present invention is prepared in the presence of a protective colloid casein. The microspheres or microparticles forming the adhesive are prepared via aqueous suspension polymerization of: (1) from 70 to 99.9 percent by weight of one or more monomers selected from the group consisting of alkyl acrylate esters and alkyl(meth)acrylate esters, (2) from 0.1 to 10 percent by weight of one or more alpha-monoolefin carboxylic acids (crotonic acid) and (3) from 0 to about 29.9 percent by weight of one or more vinyl monomers other than those identified above as (1) and (2).

The above described acrylate copolymer adhesive displays an aggressive initial tack but with low adhesion peel properties and eliminates the prior art need for a release liner or other silicone layer to protect the adhesive. The acrylate copolymer adhesive of the present invention permits a printed label 2 of the present invention to be repeatedly removed and re-adhered i.e. repositioned onto any suitable surface, for example a customer bag B as shown in FIG. 7 or to secure the wrapping 42 around a foodstuff as shown in FIG. 8 and when the label is in the form of a receipt, it also functions to identify the contents of the wrapping or bag. The acrylate copolymer adhesive of the present invention has does not result in adhesive buildup on the moving parts of the thermal printer which, as noted earlier, can adversely affect the performance of the printer and the cutter bar. As a result, the adhesive of the present invention need not be applied to the web in limited areas in an effort to reduce adhesive buildup within the printer. The label according to the present invention therefore provides superior adhesion due to the relatively large surface area of the adhesive and the continuous and uninterrupted extent of the adhesive along the entire length of the printed label.

Figure 10:
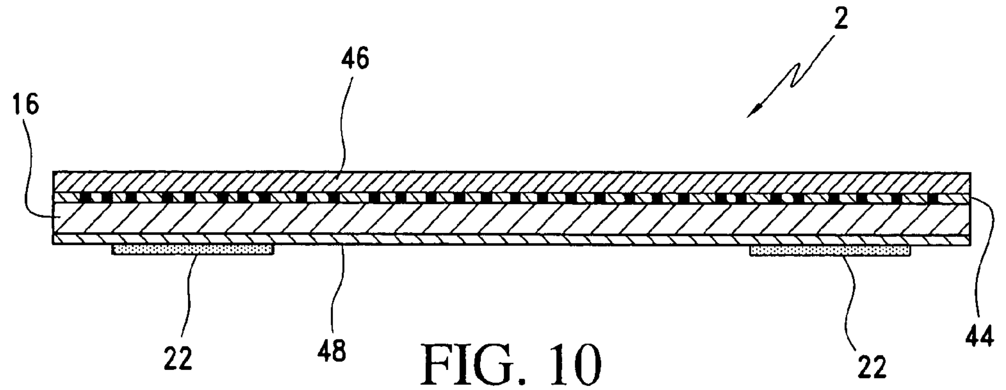
FIG. 10 is cross-sectional view of the thermally printed label shown in FIG. 7 and taken along lines 10-10.

FIG. 10 illustrates a printed label 2 shown in FIG. 7 and where the thermoreactive coating or layer 44 has been heat activated so that indicia in the form of print is visible.

Figure 11:
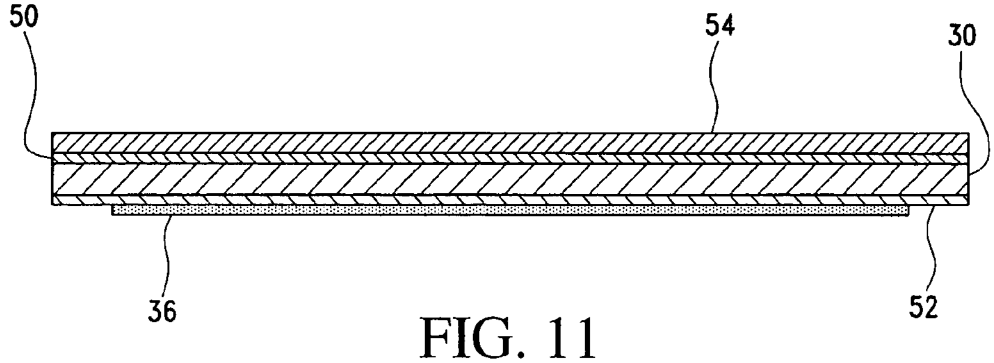
FIG. 11 is a cross-sectional view of a label shown in FIG. 5 and taken along lines 11-11.

FIG. 11 illustrates a cross-section of the sheet material 30 shown in FIG. 5 and wherein the substrate 30 is provided with a thermoreactive layer 50, a base coat 52, a top coat 54 all of which as described above and where the continuous uninterrupted layer of the adhesive 36 extends substantially the width of the second surface of the substrate 30.

Figure 12:
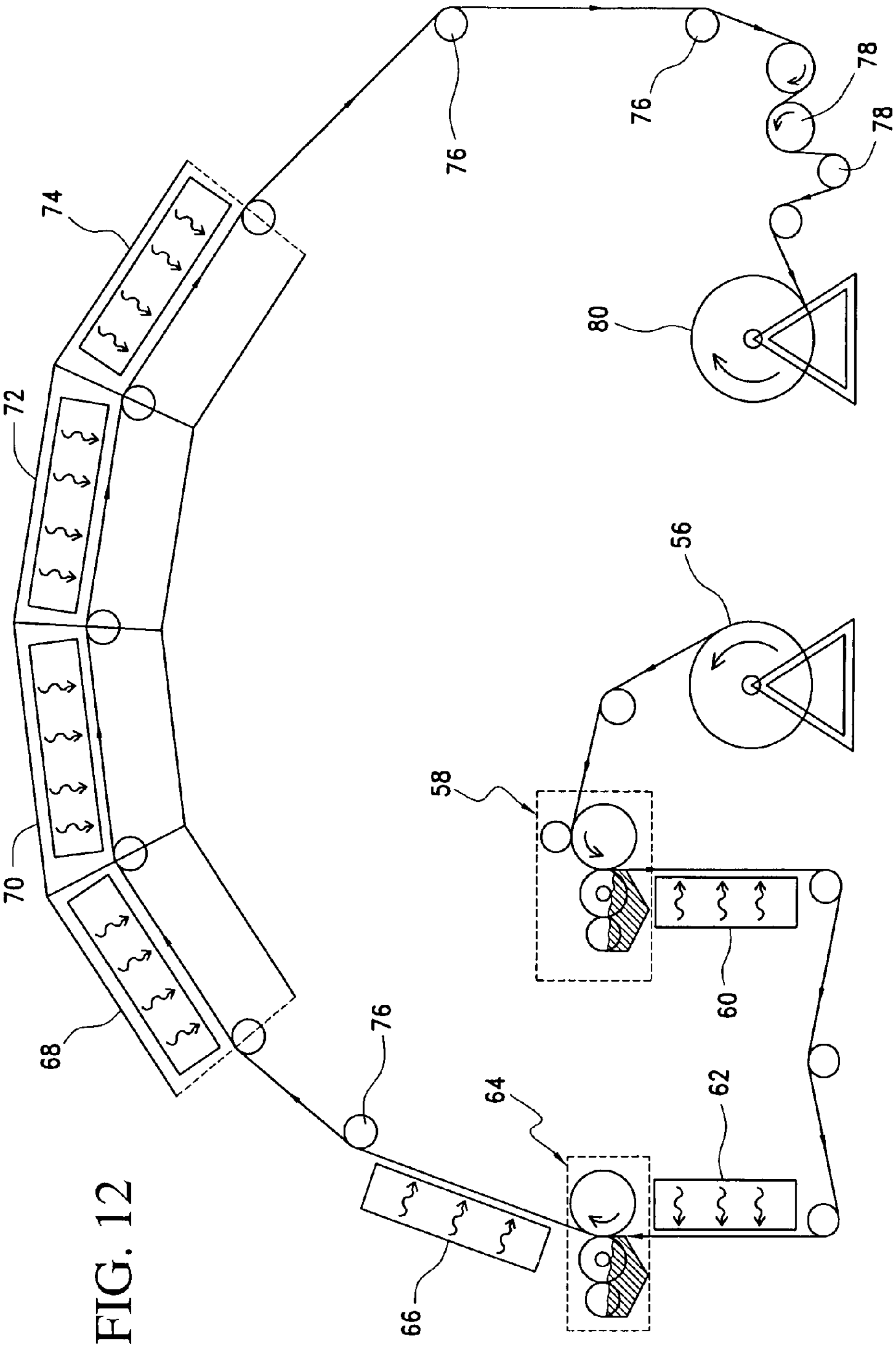
FIG. 12 is a schematic drawing illustrating stage one of the manufacturing process for the present invention.
Figure 13:
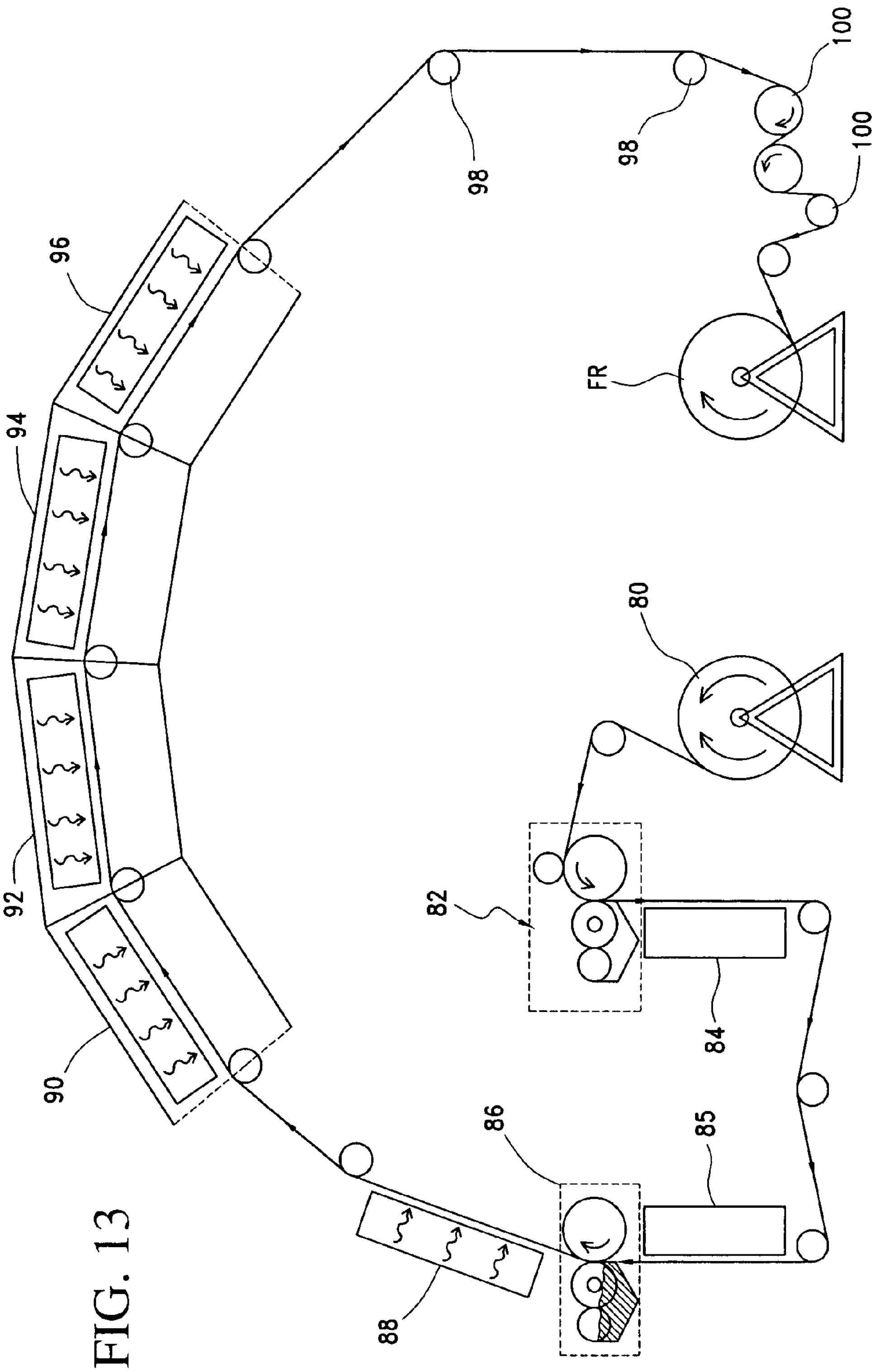
FIG. 13 is a schematic drawing illustrating stage two of the manufacturing process for the present invention.

Turning to FIG. 12, a two station, roll to roll coating line is shown for stage one of the method of manufacture of the present invention whereas FIG. 13 illustrates stage two of the process.

A parent roll 56 of a stock thermosensitive sheet material is first provided with the cellulosic top or release coat at station 58 and then is passed by a first dryer 60 and second dryer 62 before entering coating station 64 where the base coat preparation discussed earlier is applied to the underside of the sheet material. The underside coated material is then passed by a dryer before entering four independently adjustable drying regions 68, 70, 72 and 74 which are enclosed drying ovens. The thus coated and dried web is passed though a series of idler rollers 76 and/or non-nipping web drive rollers 78 before being reloaded onto a new parent roll 80.

The new parent roll 80 is then allowed to sit and cure under ambient room temperature for not less than about twenty four hours.

Turning to FIG. 13, stage two of the manufacture process is shown. New parent roll 80 unwinds and is conveyed into a first coating station 82 but no coating is applied nor is dryer 84 and 85 operated. At second coating station 86 and pressure sensitive adhesive is applied to the coated underside of the web and in a continuous and uninterrupted manner as described earlier. The adhesive coated web is then passed through first dryer 88 and the dried adhesive coated web passes into four independent drying ovens 90, 92, 94 and 96 which are independently adjustable in the manner described earlier. The over dried web passes through idler rollers 98 and/or pinch rollers 100 before the finished roll FR is wound onto a mandrel.

While this invention has been described as having a preferred design, it is understood that it is capable of further modifications, and uses and adaptations of the invention following in general the principle of the invention and including such departures from the present disclosure as come within the known or customary practice in the art to which the invention pertains, and as may be applied to the central features described above and falling within the scope of the invention or limits of the attached claims.

What is claimed is:

1. A continuous liner-free repositionable label roll for use in a thermal point-of-sale printer having an auto-cutting mechanism comprising:

a) a web of thermal paper having a top surface and a bottom surface wound into a continuous roll without preset tear areas thereon;

b) a base coat provided on said bottom surface;

c) at least one adhesive strip provided on said bottom surface, said adhesive strip extending in a substantially uninterrupted manner along a running axis of said web wherein said base coat secures the adhesive of the at least one adhesive strip to the bottom surface to prevent fouling of the auto-cutting mechanism of the point of sale printer and wherein the adhesive of the at least one adhesive strip comprises acrylate copolymer formed into microparticles, microspheres or combinations thereof; and d) a silicone-free release coat provided on said top surface, said release coat extending along said running axis of said web and behind said at least one adhesive strip so that when said web of thermal paper is caused to be thermally printed and cut by the auto-cutting mechanism to a variable length determined by the amount of printing on the web, said adhesive will extend in a continuous manner along the length of said thermally printed paper to form a repositionable label.

2. The continuous label roll as in claim 1 comprising a second adhesive strip extending in a substantially uninterrupted manner along a running axis of said web and substantially parallel to said at least one adhesive strip.

3. The continuous label roll as in claim 1 and wherein said at least one adhesive strip extends over substantially the entire bottom surface of said web.

4. The continuous label roll as in claim 1 wherein said base coat prevents migration of the adhesive of said at least one adhesive within said web of thermal paper.

5. The continuous label roll as in claim 1 and wherein said release coat is selected from the group consisting of starches, cellulose, maltodextrin and combinations thereof.

6. The continuous label roll of claim 1 wherein the base coat comprises polyvinyl alcohol, starch, modified starches, gelatin, latex, styrene-butadiene rubber latex, styrene maleic anhydride salts, polyacrylate, polyvinylacetate, polystyrene, methyl cellulose, carboxymethyl cellulose, hydroxyethyl cellulose, or hydroxypropylmethyl cellulose or a derivative thereof.

* * * * *